(12) United States Patent
Lühr

(10) Patent No.: US 9,284,840 B2
(45) Date of Patent: Mar. 15, 2016

(54) PERSONAL SAFETY SYSTEM

(71) Applicant: Dräger Safety AG & Co. KGaA, Lübeck (DE)

(72) Inventor: Matthias Lühr, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 14/045,872

(22) Filed: Oct. 4, 2013

(65) Prior Publication Data

US 2015/0097414 A1 Apr. 9, 2015

(30) Foreign Application Priority Data

Oct. 6, 2012 (DE) .......................... 10 2012 019 700

(51) Int. Cl.
*E21F 11/00* (2006.01)

(52) U.S. Cl.
CPC ..................................... *E21F 11/00* (2013.01)

(58) Field of Classification Search
CPC ....................................................... E21F 11/00
See application file for complete search history.

(56) References Cited

U.S. PATENT DOCUMENTS

| | | | | |
|---|---|---|---|---|
| 1,744,890 | A * | 1/1930 | Hanrahan | 128/204.15 |
| 2,918,356 | A * | 12/1959 | Hay | 422/120 |
| 3,088,810 | A * | 5/1963 | Hay | 422/117 |
| 3,240,567 | A * | 3/1966 | Caparreli et al. | 206/525 |
| 8,007,047 | B2 | 8/2011 | Kennedy et al. | |
| 2008/0196329 | A1 | 8/2008 | Kennedy et al. | |
| 2008/0216653 | A1 * | 9/2008 | Paton-Ash et al. | 95/149 |
| 2009/0084126 | A1 * | 4/2009 | Schartel | 62/260 |
| 2009/0235816 | A1 | 9/2009 | Farrugia et al. | |
| 2010/0190241 | A1 * | 7/2010 | Jaggi | 435/292.1 |
| 2011/0107681 | A1 | 5/2011 | Zhang | |
| 2012/0233923 | A1 | 9/2012 | Diercks | |
| 2012/0304866 | A1 * | 12/2012 | Barrett | 96/244 |
| 2014/0199211 | A1 * | 7/2014 | Raber | 422/122 |

FOREIGN PATENT DOCUMENTS

| | | |
|---|---|---|
| CN | 102011608 A | 4/2011 |
| CN | 102022136 A | 4/2011 |
| CN | 201 857 993 U | 6/2011 |
| CN | 102562134 A | 7/2012 |
| DE | 33 35 390 A1 | 4/1985 |
| DE | 10 2011 014 104 B3 | 6/2012 |
| JP | 2007-69075 A | 3/2007 |
| WO | 2008/039347 A2 | 4/2008 |
| WO | 2009/152730 A1 | 12/2009 |

OTHER PUBLICATIONS

Chinese Search Report of Mar. 31, 2015.

* cited by examiner

*Primary Examiner* — John Kreck
(74) *Attorney, Agent, or Firm* — McGlew and Tuttle, P.C.

(57) ABSTRACT

A personal safety system in the form of a refuge chamber with at least one main room and a carbon dioxide absorber (10) provided for absorbing carbon dioxide out of the ambient air of the main room. The carbon dioxide absorber (10) has a body (14) and a basket (12) that can be inserted into the body (14) for receiving loose soda lime. With this, any static charges of previously used soda lime cartridges are avoided and dangers arising therefrom, in potentially explosive areas, are ruled out.

17 Claims, 3 Drawing Sheets

PERSONAL SAFETY SYSTEM

CROSS REFERENCE TO RELATED APPLICATIONS

This application claims the benefit of priority under 35 U.S.C. §119 of German Patent Application DE 10 2012 019 700.4 filed Oct. 6, 2012, the entire contents of which are incorporated herein by reference.

FIELD OF THE INVENTION

The present invention pertains to a personal safety system in the form or in the style of a so-called refuge chamber or a safety room, as it can be used for personal safety, for example, in mining, and especially in potentially explosive areas, i.e., for example, in coal mining.

BACKGROUND OF THE INVENTION

For such refuge chambers/safety rooms it is well known that they require devices for carbon dioxide absorption if people stay in the interior thereof. Prior-art carbon dioxide absorbers are often based on the use of plastic cartridges with chemicals contained therein, wherein the plastic cartridges may, however, trigger electrical discharges or arcing because of static electricity and thus ignite ignitable mixtures (for example, methane, coal dust, etc.) and cause explosions.

A refuge chamber with a means for cooling and dehumidifying the interior space of the refuge chamber is known from CN 201 857 993 U. The achieving of the cooling action is based in this case on the use of compressed liquid carbon dioxide ($CO_2$). The liquid carbon dioxide is provided in the compressed form in containers provided for this and is supplied via a pressure reducer, on the one hand, to a vortex tube for cooling and, on the other hand, to a pneumatic motor for driving a fan. In addition, the ambient heat taken up during the driving of the pneumatic motor with carbon dioxide as well as an air stream generated with a drive of a fan by the pneumatic motor shall be used for cooling the interior space of the refuge chamber as well. The pneumatic motor is combined with, among other things, a radiator into an air dehumidifying and air purifying unit. Corresponding chemicals, which are placed in the air stream arising because of the fan by means of the air dehumidifying and air purifying unit, are provided for absorbing carbon dioxide ($CO_2$) and carbon monoxide (CO) in the ambient air in the interior of the refuge chamber.

A refuge chamber for use in mining, comprising a cooling means, which can be put into operation only at a methane concentration below a predetermined level within the refuge chamber, is known in U.S. Pat. No. 8,007,047 B2. In U.S. Pat. No. 8,007,047 B2, cloths with a coating suitable for absorption, which are hung on the inner walls of the refuge chamber and thus shall come into sufficient contact with the ambient air in the interior of the refuge chamber, are provided for the absorption of carbon dioxide in the ambient air in the interior of the refuge chamber.

A personal safety system in the form of a refuge chamber with a security entrance, a holding room connected to the security entrance and with an air curtain device on the entrance door of the security entrance, is known from the not previously published DE 10 2011 014 104 of Mar. 28, 2011. So that persons can reach the holding room in a short time, a circulating air system is provided for the interior space of the refuge chamber. Besides the holding room, the interior space also includes the security entrance. The circulating air system comprises an air feed means and a toxic gas filter, an air flushing means comprising air cells for the holding room as well as a gas supply duct for respirator products in the holding room.

SUMMARY OF THE INVENTION

Based on this state of the art, an object of the present invention is to provide a further embodiment of a personal safety system of the type mentioned in the introduction, which is characterized by an especially simple-to-operate carbon dioxide absorber ($CO_2$ absorber), which avoids hitherto existing dangers as are accompanied by the use of plastic cartridges.

According to the present invention, a device is provided as a personal safety system in the form or the style of a so-called refuge chamber or safety room, as it is used for personal safety, for example, in mining. For this, a personal safety system is provided in the form of a refuge chamber with at least one main room as well as with a carbon dioxide absorber provided for absorbing carbon dioxide out of the ambient air of the main room. The carbon dioxide absorber has a body and a basket which is insertable into the body for taking up loose soda lime.

The advantage of the present invention lies in the fact that loose soda lime can be used, which can be poured into the basket, when previously used soda lime was saturated and was removed from the basket. Prior-art carbon dioxide absorbers are often based on the use of plastic cartridges filled with soda lime. An electrical discharge or an arcing may occur in such plastic cartridges. Such discharges or arcings may ignite ignitable mixtures, e.g., methane, coal dust or the like and trigger explosions. The loose soda lime, usable with the carbon dioxide absorber according to the invention, which is poured into a basket belonging to the carbon dioxide absorber and which can be inserted into a body of the carbon dioxide absorber, avoids such dangers. A loose bed, which can additionally be changed rapidly and without problems, when the soda lime is consumed, i.e., its absorbability is depleted, forms with the soda lime located there in the basket.

Provisions are made in an embodiment of the personal safety system for the carbon dioxide absorber to have a connection pipe, with which the carbon dioxide absorber is connected or can be connected to a $CO_2$ cooling system, likewise located in the main room of the refuge chamber. The connection pipe may be designed in this case as a connection pipe carrying the body in the manner of a foot. The connectability of the carbon dioxide absorber to the $CO_2$ cooling system makes possible the utilization of an air stream provided for the $CO_2$ cooling system for improving carbon dioxide absorption. In particular, for example, a pneumatic blower with a pneumatic motor and a fan driven by the pneumatic motor is associated with such a $CO_2$ cooling system. Such a pneumatic motor is likewise—precisely like the loose soda lime—best suited for use in potentially explosive areas. The pneumatic motor sets the fan into motion and thus an air stream is generated in the area of a heat exchanger comprised by the $CO_2$ cooling system. This air stream is effective, on the one hand, for obtaining a favorable air distribution in the refuge chamber and thus for an efficient, comprehensive cooling, as well as, on the other hand, for the continuous supply of ambient air to the heat exchanger as well. The latter helps prevent a freezing up of the heat exchanger or to at least markedly lower a risk in this respect. When the carbon dioxide absorber is now connected to the $CO_2$ cooling system, the air stream generated by the pneumatic blower brings about a supply of ambient air through the carbon dioxide absorber to the heat exchanger of the $CO_2$ cooling system; ambient air is thus drawn in by the carbon dioxide absorber and thus through the bed formed in the carbon dioxide absorber. Consequently, the soda lime is actively passed through and the effective quantity of air that comes into contact with the soda lime per time unit and thus can release carbon dioxide to the soda lime is markedly increased. This shortens a duration, within which a critical carbon dioxide concentration can be noticeably reduced or guarantees during a longer operating time that carbon dioxide is usually absorbed to a sufficient extent, such that a carbon dioxide concentration in the main room of the refuge chamber cannot exceed at least a critical threshold value.

If the connection pipe of the carbon dioxide absorber has sealable air inlets, a quantity of ambient air drawn in through the air inlets can be regulated by the circumference of the opening of the air inlets. Thus, the quantity of air drawn in through the bed with the loose soda lime can be influenced.

When the carbon dioxide absorber is connected to a floor of the refuge chamber by a ground clip in an electrically conductive manner and is grounded via the refuge chamber, it is additionally ensured that a possible static charge is at any rate immediately diverted and no risks of discharges or arcings may arise.

Even though the present invention was described as a personal safety system with a carbon dioxide absorber up to now, the present invention also pertains to such a carbon dioxide absorber proper, which is suitable for use in a personal safety system.

An exemplary embodiment of the present invention is described in detail below on the basis of the drawing. Objects or components corresponding to one another are provided with the same reference numbers in all figures.

The exemplary embodiment or each exemplary embodiment is not to be defined as a limitation of the present invention. Rather, changes and modifications are possible within the framework of the present disclosure, especially such variants and combinations, which can be derived for the person skilled in the art with regard to accomplishing the object, for example, by combining or modifying individual features or components or process steps described in conjunction with the general or special section of the specification as well as contained in the claims and/or drawing and lead, by means of combinable features, to a novel subject or novel process steps or process step sequences, even if they pertain to testing methods and working methods. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
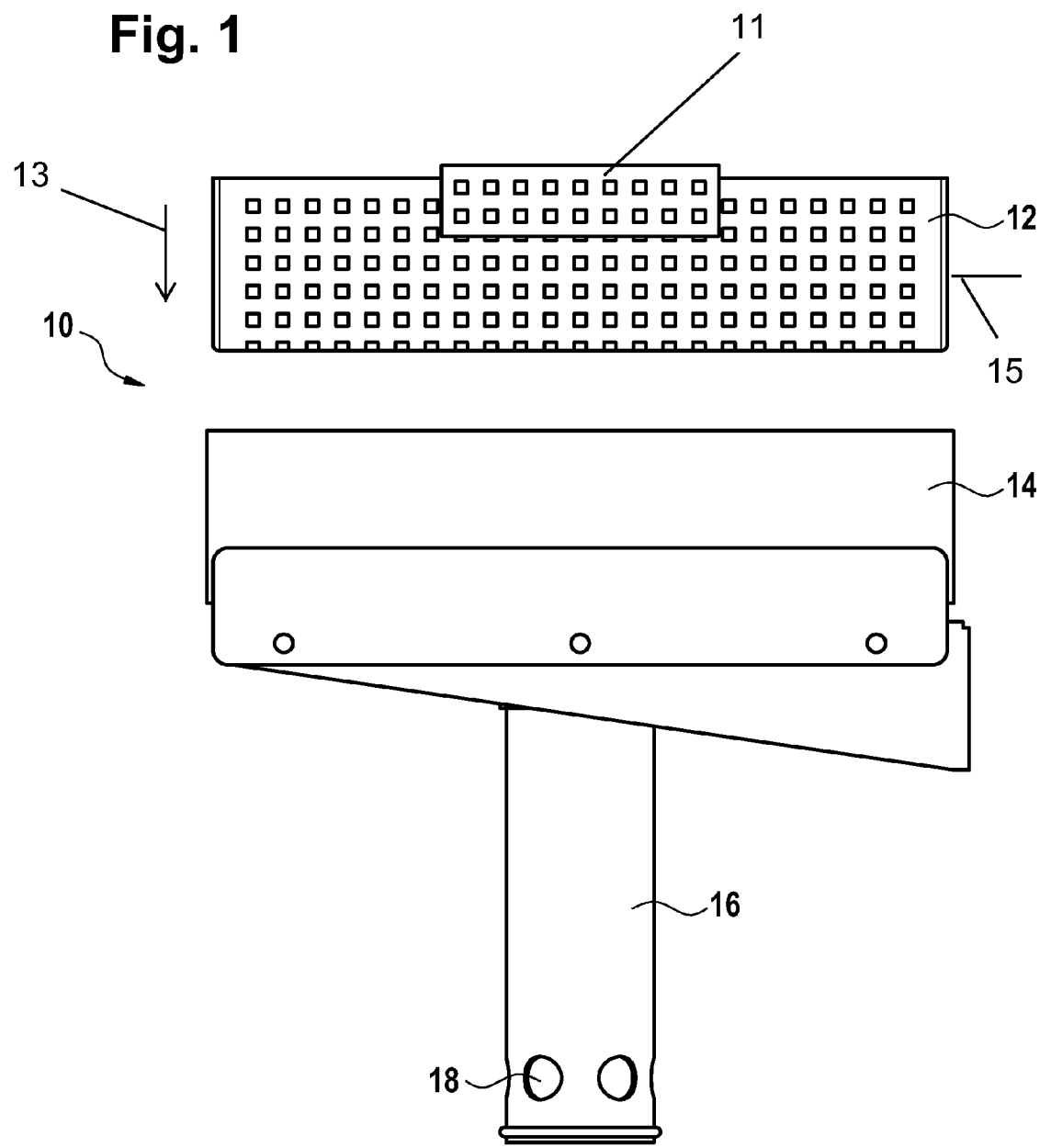
FIG. 1 is a schematic view of a $CO_2$ absorber in the form of a $CO_2$ bed absorber for use in a personal safety system.

Referring to the drawings in particular, FIG. 1 shows a schematically simplified schematic view of a $CO_2$ bed absorber 10 functioning as a carbon dioxide absorber ($CO_2$ absorber), which in the embodiment shown essentially comprises a basket 12 and a body 14. The $CO_2$ absorber shall prevent a $CO_2$ concentration from rising above a permissible mass in the ambient air, by gaseous carbon dioxide being bound by soda lime located in the absorber.

Figure 2:
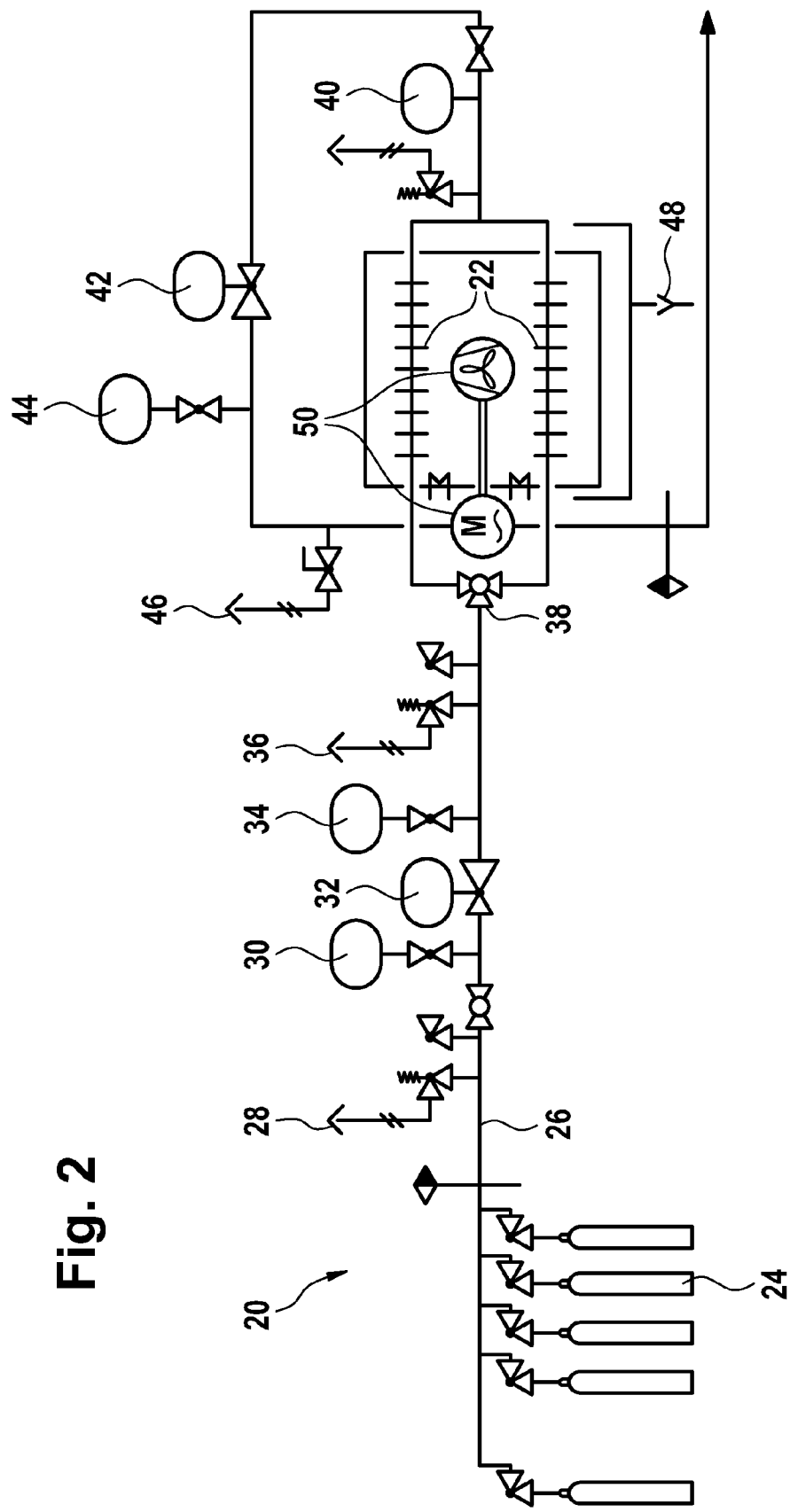
FIG. 2 is a schematic view of a $CO_2$ cooling system for use in a personal safety system.

The body 14 of the $CO_2$ bed absorber 10 is attached to a connection pipe 16, in whose foot air inlets 18, especially sealable air inlets 18, in the form of borings or the like are formed. Soda lime is filled into the basket 12, and the basket 12 is hung (suspended and supported) in the body 14. The rectangular structure 11 shown at the top of FIG. 1 is adapted for hanging the basket 12 in/on the body 14. Preferably the rectangular structure 11 is shaped as a handle which overlaps the sidewall of the body 14 when the basket 12 is inserted in/on the body 14 in an insertion direction 13. The insertion direction 13 is perpendicular to a longitudinal axis 15 of the basket. The connection pipe 16 is connected by means of a tube or hose connection, for example, to a supply air stream of a heat exchanger 22 (FIG. 3) comprised of a $CO_2$ cooling system 20 (FIG. 2). Thus, ambient air is drawn in through the soda lime bed formed in the basket 12 and bound to $CO_2$ present there. When the soda lime has lost its bindability, it is disposed of by simply pouring the spent soda lime into a residue container, not shown here. The basket 12 is then inserted into the body 14 again and filled with new soda lime or is filled with new soda lime before inserting into the body 14.

The quantity of incoming air drawn in by means of the soda lime bed to the heat exchanger 22 can be regulated with sealable air inlets 18. A sealability of the air inlets 18 can be achieved for example by a rotatable sleeve, mounted concentrically to the connection pipe 16, with borings corresponding to the air inlets 18 being arranged in the connection pipe 16 or outside the connection pipe 16 (not shown). By means of a rotation of the sleeve, the air inlets 18 in the connection pipe 16 and borings in the sleeve can be synchronized, such that secondary air can be drawn into the connection pipe 16. This reduces the quantity of incoming air drawn in by the soda lime bed to the heat exchanger 22. When the air inlets 18 in the connection pipe 16 are entirely or partly closed by means of a rotation of the sleeve, the quantity of the incoming air drawn in by the soda lime bed increases. Instead of a rotatable sleeve, a displaceable sleeve may also be considered. Borings in the sleeve may be omitted in this case, and the extent, to which the air inlets 18 in the connection pipe 16 are opened or closed, arises due to the translatory position of such a sleeve.

FIG. 2 shows in a schematically simplified schematic view a carbon dioxide cooling system, also designated below, in short, as $CO_2$ cooling system 20, for use in a personal safety system of the type mentioned in the introduction. This carbon dioxide cooling system comprises a heat exchanger 22 and furthermore, for example, one or more steel cylinders 24 each filled with liquid carbon dioxide as storage containers for liquid carbon dioxide and thus as $CO_2$ reservoir. These steel cylinders 24 are connected via a main line 26 to a first safety valve 28, a first pressure indicator 30, a first pressure reducer 32, another pressure indicator 34, a second safety valve 36 and a three-way valve 38 at the heat exchanger 22, downstream of which on the output side are arranged a consumption indicator 40, another pressure reducer 42, a drain valve 44 and a third safety valve 46.

A switching over between at least a first and a second cooling coil comprised by the heat exchanger 22 is possible with the three-way valve 38. The three-way valve 38 can be operated either manually or automatically and makes possible a switching over between the at least two cooling coils in order to make possible a thawing of a respective, unused cooling coil. This makes the $CO_2$ cooling system 20 overall fail-safe to a great extent, because due to the possibility of thawing an unused cooling coil, there is always the possibility of switching over to a usable cooling coil in order to thus obtain a sufficient cooling capacity. With two cooling coils, an alternating use of cooling coils is thus possible, whereby the respective, unused cooling coil is thawed. In case of more than two cooling coils, a cyclical use of the cooling coils is possible, whereby the respective, unused cooling coils or the last used cooling coil are thawed or is thawed, respectively. A drainage device 48, by means of which water of condensation, which is collected in a collecting tray provided for this purpose, can be drained and disposed of in a suitable manner, is shown below the heat exchanger 22.

Figure 3:
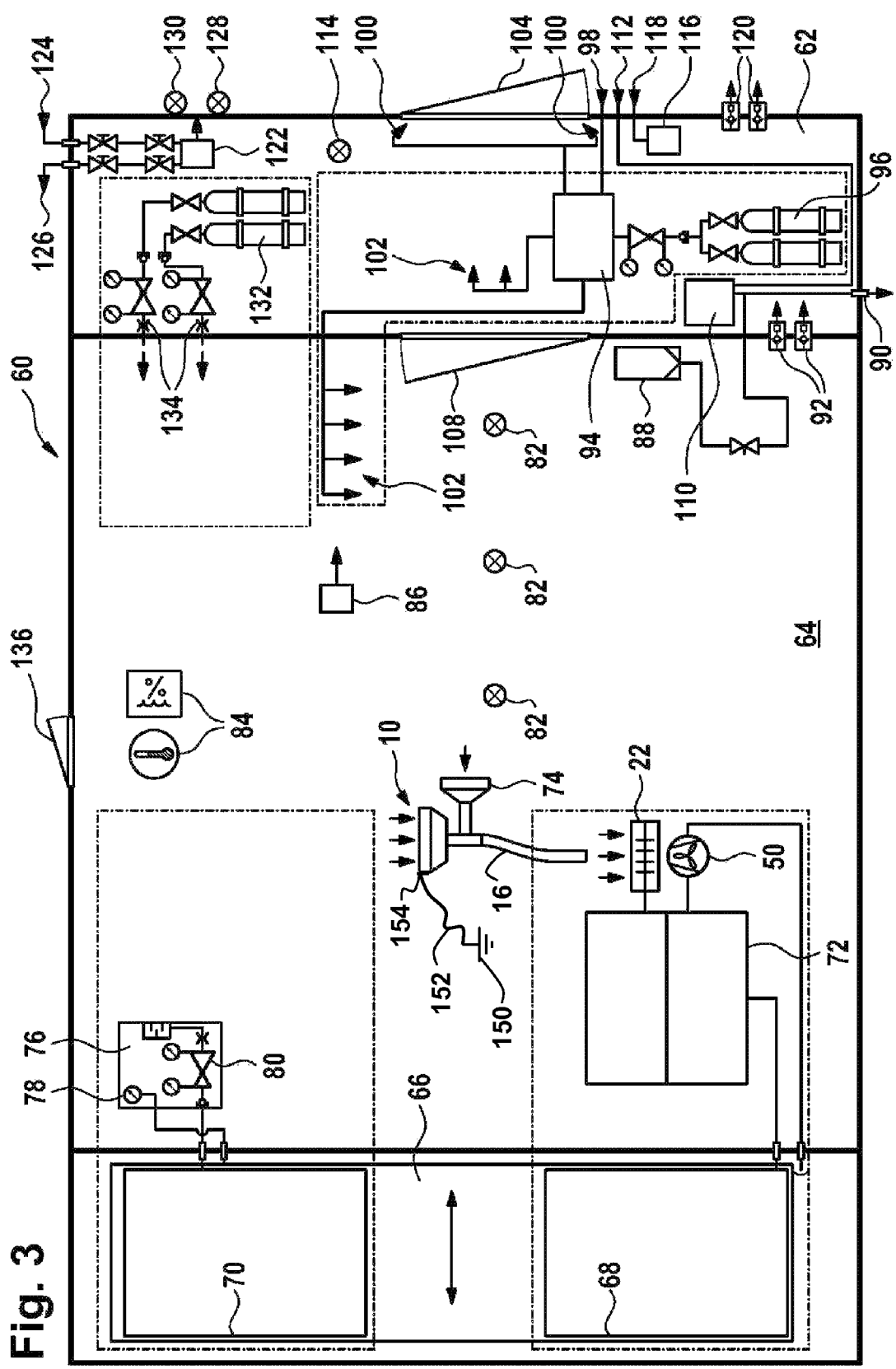
FIG. 3 is a general view of a refuge chamber functioning as personal safety system with a $CO_2$ bed absorber according to FIG. 1 as well as a $CO_2$ cooling system according to FIG. 2.

A pneumatic blower 50 with a pneumatic motor with a fan driven thereby is associated with the heat exchanger 22 with the at least two cooling coils. The pneumatic blower 50 draws air through the $CO_2$ absorber and to the heat exchanger 22 (FIG. 3). The use of a pneumatic motor has the advantage of its problem-free usability in a potentially explosive area. The fan driven by the pneumatic motor makes possible a uniform and rapid distribution of cooled ambient air in the interior space of the personal safety system and a supply of ambient air to the heat exchanger 22.

The use of at least two pressure reducers 32, 42, in particular, a first pressure reducer 32 in the main line from the steel cylinders 24 to the heat exchanger 22 in this case, i.e., on the high pressure side, and a second pressure reducer 42 in connection with the heat exchanger 22, i.e., on the low pressure side, makes possible a gradual drop in pressure of the liquid carbon dioxide, in particular, for example, from 200 bar initially to 10 bar (first pressure reducer 32) and then to 2 bar to 6 bar (second pressure reducer 42). Such a gradual drop in pressure effectively prevents the pipelines from freezing solid and thus guarantees the availability of the $CO_2$ cooling system 20.

FIG. 3 shows a personal safety system in the form of a refuge chamber 60 designated overall with the reference number 60. This refuge chamber 60 comprises in a manner known per se an air lock 62, a main room 64 and an engineering room 66. The engineering room 66 is divided into a first storage area 68 and a second storage area 70. Steel cylinders 24 (FIG. 2) containing liquid carbon dioxide, for example, 12 cylinders containing 40 L of liquid carbon dioxide each at a pressure of 200 bar, for a $CO_2$ cooling system 20, and especially a $CO_2$ cooling system 20 of the type shown in FIG. 2, are found in the first storage area 68. The first storage area 68 and the steel cylinders 24 provided there can accordingly be regarded individually or together as a $CO_2$ reservoir. Containers containing breathing air, for example, 10 steel cylinders each containing 50 L of breathing air at a pressure of likewise 200 bar, are found in the second storage area 70, functioning as a breathing air storage unit. A cylinder carriage, indicated in this case only by the double arrow, is optionally found in the engineering room 66 for the facilitated handling of the steel cylinders.

The liquid carbon dioxide stored in engineering room 66 is, on the one hand, fed to heat exchanger 22 and, on the other hand, to the pneumatic blower 50. A control panel 72 in this case makes possible an operation of heat exchanger 22 and/or pneumatic blower 50. The control panel 72 can be designed in this case—as shown—in two parts or in the form of two individual control panel components, such that a first part or a first section or a first control panel component is reserved for the operation and/or observation of the heat exchanger 22 and a second part/second section or a second control panel component is reserved for operation and/or observation of pneumatic blower 50. The components of the $CO_2$ cooling system 20 shown in FIG. 2, in particular, first safety valve 28, pressure indicator 30, first pressure reducer 32, pressure indicator 34, second safety valve 36, three-way valve 38, consumption indicator 40, second pressure reducer 42 and third safety valve 46 may be associated with the control panel 72 as well for this, such that, in a collective manner, on the one hand, an overview of the status of the $CO_2$ cooling system 20 and/or of the heat exchanger 22 as well as, on the other hand, a possibility of operating the $CO_2$ cooling system 20 and/or the heat exchanger 22 is given.

In the embodiment shown, a $CO_2$ absorber 10, for example, a $CO_2$ absorber 10 according to FIG. 1, is disposed in the refuge chamber 60. The connection pipe 16 thereof (FIG. 3) is extended in the direction of the heat exchanger 22, such that incoming air, for the heat exchanger 22, is drawn in past the $CO_2$ absorber 10. In the embodiment shown, a $CO_2$ filter 74 is also associated with the $CO_2$ absorber 10.

The $CO_2$ absorber 10 is connected to electric ground potential 150 via a ground clip (or the like) 154. The ground clip 154 is attached electrically to the housing (to the 14) of the refuge chamber 60 and is attached in an electrically conductive manner 152 to the floor (or other structure at ground potential 150) of the main room 64 and is thus grounded via the refuge chamber.

The breathing air provided in the second storage area 70 can be discharged by means of operating actions at a control panel, designated as air control panel 76 for differentiation, in the main room 64 of the refuge chamber. The air control panel 76 comprises for this, on the one hand, a room pressure gauge 78 and, on the other hand, a room air valve 80 for adjusting the breathing air drawn from the breathing air storage area 70.

Further shown details in refuge chamber 60 are a main room lighting 82 with lighting means in the form of glow sticks or the like, means 84 for measuring temperature and/or humidity, a gas meter 86 for measuring the concentrations of one or more gases, such as, for example, $CH_4$, $CO$, $CO_2$, $O_2$, in the interior of the main room 64.

In addition, a dehumidifier 88 with a dehumidifier outlet 90 routed into the air lock 62, means for pressure compensation between air lock 62 and main room 64 in the form of at least one pressure compensation valve 92, as well as means for air lock flushing with a flushing unit 94, a reservoir 96 for the gas provided for the air lock flushing and gas outlets 100, 102, 104 in air lock area 62 and in the main room 64 are shown for the refuge chamber 60 shown in FIG. 3. The flushing unit 94 is supplied in this case with a corresponding gas from the reservoir 96, but is connected by an external air connection 98 also to the ambient air outside the refuge chamber 60.

The gas outlets 100, 102 in air lock area 62 function, on the one hand, as an air curtain for an outer door 106 of the refuge chamber 60 and, on the other hand, for air flushing in the air lock area. The gas outlets 104 in the main room 64 are used for flushing any contaminants from the main room 64 still having entered same after leaving the air lock 62 and passing through an inner door 108 between air lock 62 and main room 64. The outer door 106 and the inner door 108 make possible an access to the refuge chamber 60, in particular, at first via the outer door 106 into the air lock 62 and then via the inner door 108 from the air lock 62 into the main room 64.

Furthermore, a plumbing unit 110 with an external water connection 112 and, for example, a port-a-potty, an air lock lighting 114, a telephone 116 with an external telephone connection 118 and one or more overpressure valves 120 are found in the air lock area 62. Finally, another gas meter 122 is also provided in the air lock for measuring a concentration of one or more gases, for example, CH$_4$, CO, CO$_2$, O$_2$ outside the refuge chamber 60 and for this the gas meter 122 is coupled via an air inlet 124 and an air outlet 126 to the ambient air outside the refuge chamber 60. Moreover, two signaling or lighting means 128, 130 are shown, which, for example, in the form of a flashlight or in the form of a lighting station with glow sticks, make it easier to find refuge chamber 60 or indicate a status of refuge chamber 60.

Besides the breathing air which can be fed into the main room 64 from the second storage area 70, which may also be considered to be emergency breathing air supply, steel cylinders 132 for oxygen supply of the main room 64, functioning as main breathing air supply, with corresponding oxygen outlets 134 are shown in FIG. 3 in the area of air lock 62. The arrangement of one or more steel cylinders 132 or the like in air lock 62 or in the engineering room 66 for feeding the main breathing air supply and/or emergency breathing air supply may depend on the respective conditions on site and such steel cylinders 132 may accordingly be arranged either in the area of the air lock 62 or in the engineering room 66 or in the area of the air lock 62 and in the engineering room 66. An escape hatch 136 is provided for leaving the main room 64 in an emergency or the like.

Some aspects of the specification submitted here having priority can thus be summarized briefly as follows: A personal safety system is provided in the form of a refuge chamber 60 with at least one main room 64 and a carbon dioxide absorber 10 provided for absorbing carbon dioxide out of the ambient air of the main room 64, which has a body 14 and a basket 12 insertable into the body 14 for receiving loose soda lime, such that any static charges of previously used soda lime cartridges are avoided and dangers arising therefrom in potentially explosive areas are ruled out.

While specific embodiments of the invention have been shown and described in detail to illustrate the application of the principles of the invention, it will be understood that the invention may be embodied otherwise without departing from such principles.

LIST OF REFERENCE NUMBERS

| | |
|---|---|
| 10 | CO$_2$ absorber |
| 12 | Basket |
| 14 | Body |
| 16 | Connection pipe |
| 18 | Air inlet |
| 20 | CO$_2$ cooling system |
| 22 | Heat exchanger |
| 24 | Steel cylinder |
| 26 | Main line |
| 28 | (First) safety valve |
| 30 | (First) pressure indicator |
| 32 | (First) pressure reducer |
| 34 | (Second) pressure indicator |
| 36 | (Second) safety valve |
| 38 | Three-way valve |
| 40 | Consumption indicator |
| 42 | (Second) pressure reducer |
| 44 | Drain valve |
| 46 | (Third) safety valve |
| 48 | Drainage device |
| 50 | Pneumatic blower |
| 52-58 | — |
| 60 | Refuge chamber |
| 62 | Air lock |
| 64 | Main room |
| 66 | Engineering room |
| 68 | (First) storage area |
| 70 | (Second) storage area |
| 72 | Control panel |
| 74 | CO$_2$ filter |

LIST OF REFERENCE NUMBERS-continued

| | |
|---|---|
| 76 | Air control panel |
| 78 | Room pressure gauge |
| 80 | Room air valve |
| 82 | Main room lighting |
| 84 | Temperature and/or humidity measurement |
| 86 | Gas meter (main room) |
| 88 | Dehumidifier |
| 90 | Dehumidifier outlet |
| 92 | Pressure compensation valve (between main room and air lock) |
| 94 | Flushing unit (air lock flushing) |
| 96 | Reservoir (air lock flushing) |
| 98 | Air connection (flushing unit) |
| 100, 102, 104 | Gas outlet (air lock flushing) |
| 106 | Outer door |
| 108 | Inner door (between air lock and main room) |
| 110 | Plumbing unit |
| 112 | Water connection |
| 114 | Air lock lighting |
| 116 | Telephone |
| 118 | Telephone connection |
| 120 | Overpressure valve (between air lock and environment) |
| 122 | Gas meter (air lock) |
| 124 | Air inlet (for gas meter 122) |
| 126 | Air outlet (for gas meter 122) |
| 128, 130 | Lighting means |
| 132 | Steel cylinder (main breathing air supply) |
| 134 | Oxygen outlet |
| 136 | Escape hatch |

What is claimed is:

1. A personal safety system in the form of a refuge chamber, the personal safety system comprising:
    at least one main room;
    a carbon dioxide absorber for absorbing carbon dioxide out of the ambient air of the main room, the carbon dioxide absorber comprising a body and a basket detachably inserted into the body for receiving loose soda lime, said basket comprising a plurality of openings, said body comprising a body opening, said body opening being in fluid communication with said plurality of openings; and
    a CO$_2$ cooling system wherein the carbon dioxide absorber further comprises a connection pipe with which the carbon dioxide absorber is connected or can be connected to the CO$_2$ cooling system, which is likewise located in the main room of the refuge chamber functioning as the personal safety system.

2. A personal safety system in accordance with claim 1, wherein the connection pipe is connected to the body and carries the body.

3. A personal safety system in accordance with claim 1, wherein the connection pipe has sealable air inlets.

4. A personal safety system in accordance with claim 1, wherein the dioxide absorber further comprises a carbon dioxide filter.

5. A personal safety system in accordance with claim 1, further comprising:
    a ground clip; and
    a floor of the refuge chamber, wherein the carbon dioxide absorber is connected by the ground clip in an electrically conductive manner to the floor of the refuge chamber and is electrically grounded via the refuge chamber.

6. A personal safety system in accordance with claim 1, further comprising loose soda lime disposed in the basket without packaging or support other than support provided by the basket.

7. A carbon dioxide absorber for a personal safety system including a refuge chamber, the carbon dioxide absorber comprising:
- a body comprising a body opening; and
- a basket detachably inserted into the body for receiving loose soda lime, said basket comprising a basket interior space and an outer surface, said outer surface comprising a plurality of openings, said basket interior space being in communication with said body opening and an environment external to said basket via at least said plurality of openings;
- a $CO_2$ cooling system; and
- a connection pipe connected to the body and connected to the $CO_2$ cooling system.

8. A carbon dioxide absorber in accordance with claim 7, wherein the connection pipe has sealable air inlets.

9. A carbon dioxide absorber in accordance with claim 7, further comprising a carbon dioxide filter.

10. A carbon dioxide absorber in accordance with claim 7, further comprising:
- a ground clip connected to one of the body and the basket in an electrically conductive manner to electrically ground the carbon dioxide absorber.

11. A carbon dioxide absorber in accordance with claim 7, further comprising loose soda lime disposed in the basket without packaging or support other than support provided by the basket.

12. A personal safety system in the form of a refuge chamber, the personal safety system comprising:
- at least one main room comprising a main room space;
- a carbon dioxide absorber for absorbing carbon dioxide out of the ambient air of the main room, the carbon dioxide absorber comprising a body and a basket with a basket interior space and openings for passage of ambient air therethrough and with a basket structure for receiving and supporting loose soda lime, the basket being supported in a position in the body through which the ambient air flows, said basket comprising an outer surface, said outer surface defining at least a portion of each of said openings, said body comprising a body opening, wherein said openings are in fluid communication with said basket interior space, said main room space and said body opening; and
- a $CO_2$ cooling system located in the main room of the refuge chamber functioning as the personal safety system, wherein the carbon dioxide absorber further comprises a connection pipe connecting the carbon dioxide absorber with ambient air that has been cooled by the $CO_2$ cooling system.

13. A personal safety system in accordance with claim 12, wherein the connection pipe is connected to the body and carries the body.

14. A personal safety system in accordance with claim 12, wherein the connection pipe has sealable air inlets.

15. A personal safety system in accordance with claim 12, wherein the dioxide absorber further comprises a carbon dioxide filter.

16. A personal safety system in accordance with claim 12, further comprising:
- a ground clip; and
- an electrical ground source associated with the refuge, wherein the carbon dioxide absorber is connected by the ground clip in an electrically conductive manner to the floor of the refuge chamber and is electrically grounded via the refuge chamber.

17. A personal safety system in accordance with claim 12, further comprising loose soda lime disposed in the basket without packaging or support other than support provided by the basket.

* * * * *